United States Patent [19]

Beggs

[11] 4,443,034
[45] Apr. 17, 1984

[54] FOLDING PLATFORM AND SHELVES FOR USE IN VEHICLES

[75] Inventor: George Beggs, Colorado Springs, Colo.

[73] Assignee: Mechanical Plastics Corp., Pleasantville, N.Y.

[21] Appl. No.: 293,144

[22] Filed: Aug. 17, 1981

[51] Int. Cl.³ .............................................. B60N 1/10
[52] U.S. Cl. .................................. 296/65 R; 296/66; 296/69; 296/37.16; 5/118; 108/44; 108/112
[58] Field of Search .............. 296/37.1, 37.5, 37.8, 296/37.15, 37.16, 24 R; 108/44, 112, 113, 114, 90; 5/118, 119, 94, 446; 296/66, 69, 65 R; 312/257 SM, 297; 297/146, 163, 191

[56] References Cited

U.S. PATENT DOCUMENTS

| | | | |
|---|---|---|---|
| 1,871,158 | 8/1932 | Daigle | 5/118 |
| 2,357,729 | 9/1944 | de Fries | 5/118 |
| 2,634,183 | 4/1953 | Derman | 108/112 |
| 2,889,097 | 6/1959 | Broehl | 296/37.16 |
| 2,970,323 | 2/1961 | Griffith et al. | 5/118 |
| 3,011,822 | 12/1961 | May et al. | 296/66 |
| 3,097,881 | 7/1963 | Aguilar | 296/66 |
| 3,188,134 | 6/1965 | Nixon | 296/69 |
| 3,387,882 | 6/1968 | Mycue | 297/163 |
| 3,884,159 | 5/1975 | Faria | 108/112 |

Primary Examiner—Robert B. Reeves
Assistant Examiner—Dennis Pedder
Attorney, Agent, or Firm—Pennie & Edmonds

[57] ABSTRACT

A folding platform for a vehicle (12) comprising a first series of panels (2, 3, 4), and a second series of panels (5, 7, 9) which may be unfolded within the vehicle (12) to form load carrying shelves or a platform which may be used to support a mattress. The first series of panels (2, 3, 4), one of which is affixed to a shaft, rotate as a unit with the shaft. The panels fold to be stored against the rear of a folding seat back (11) in close parallel proximity to the seat back (11), thus occupying only a small volume and not interfering with the use of the rear cargo area or trunk (30) of the vehicle (12). The panels may be disposed in a flexible fabric container (101, 105) with seams between the panels serving as hinges.

28 Claims, 20 Drawing Figures

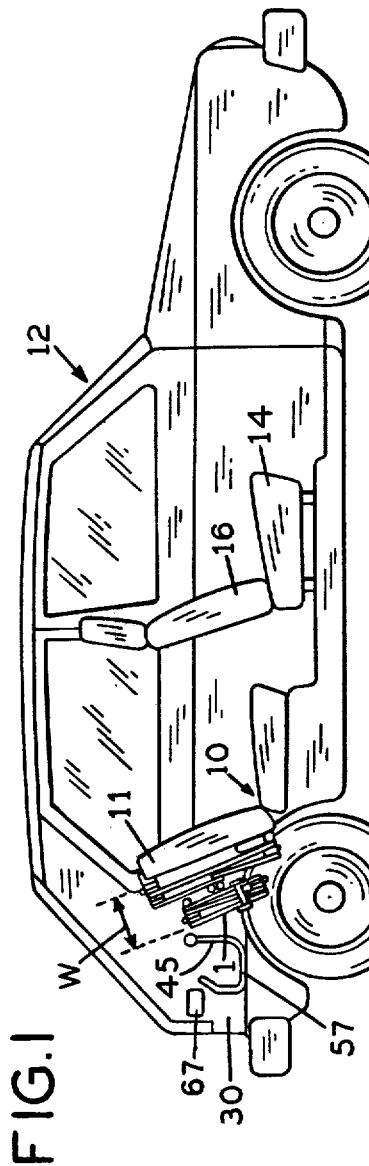
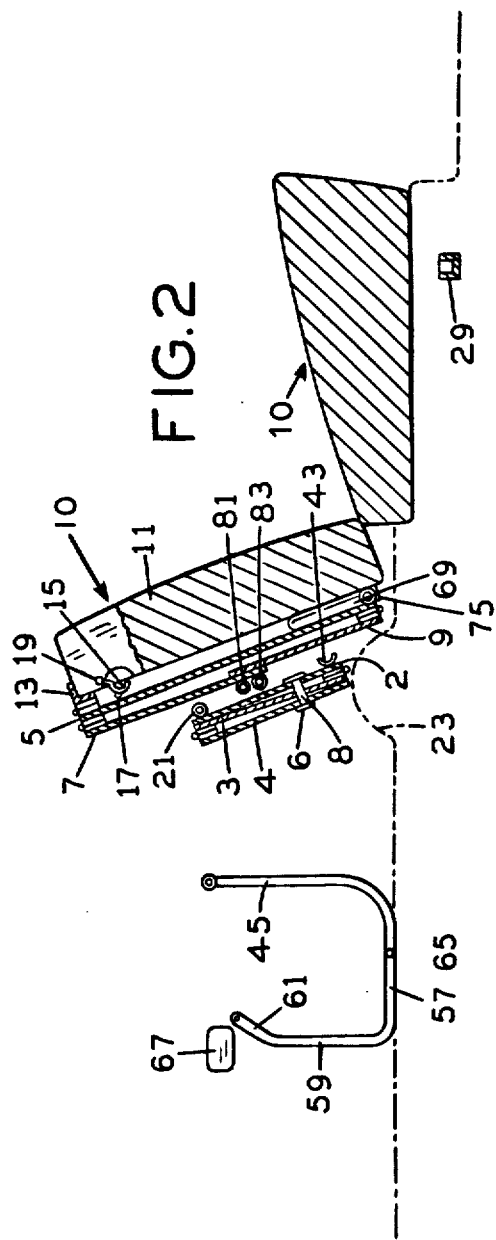

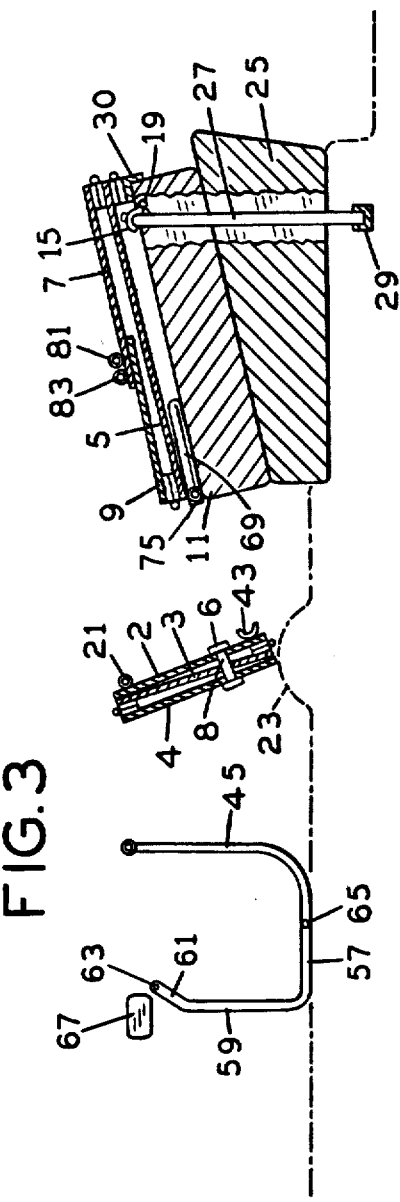
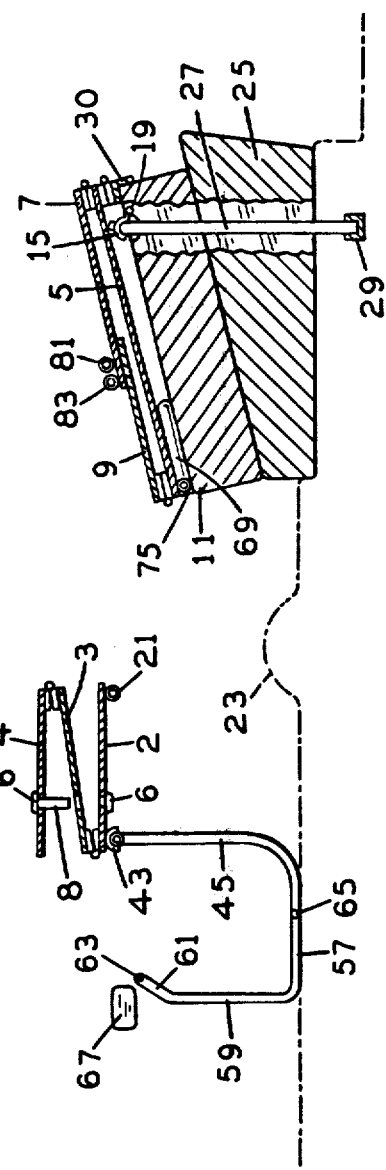

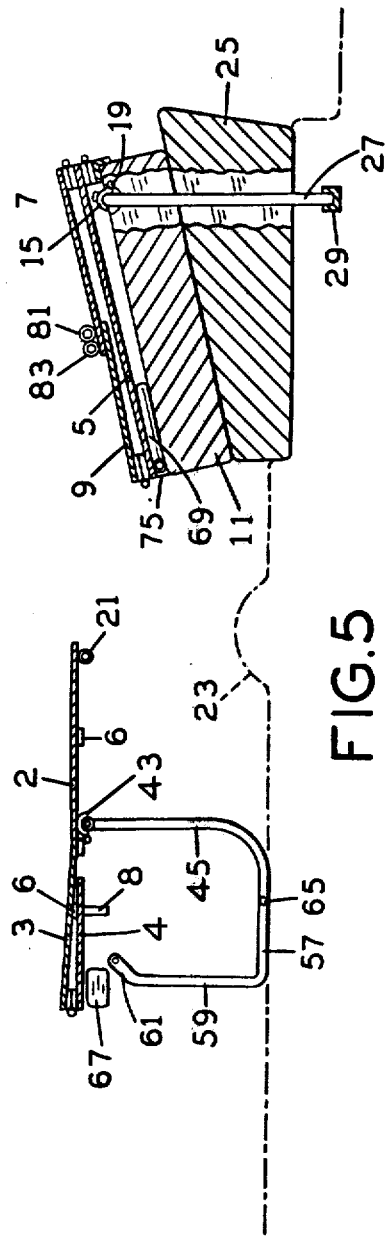
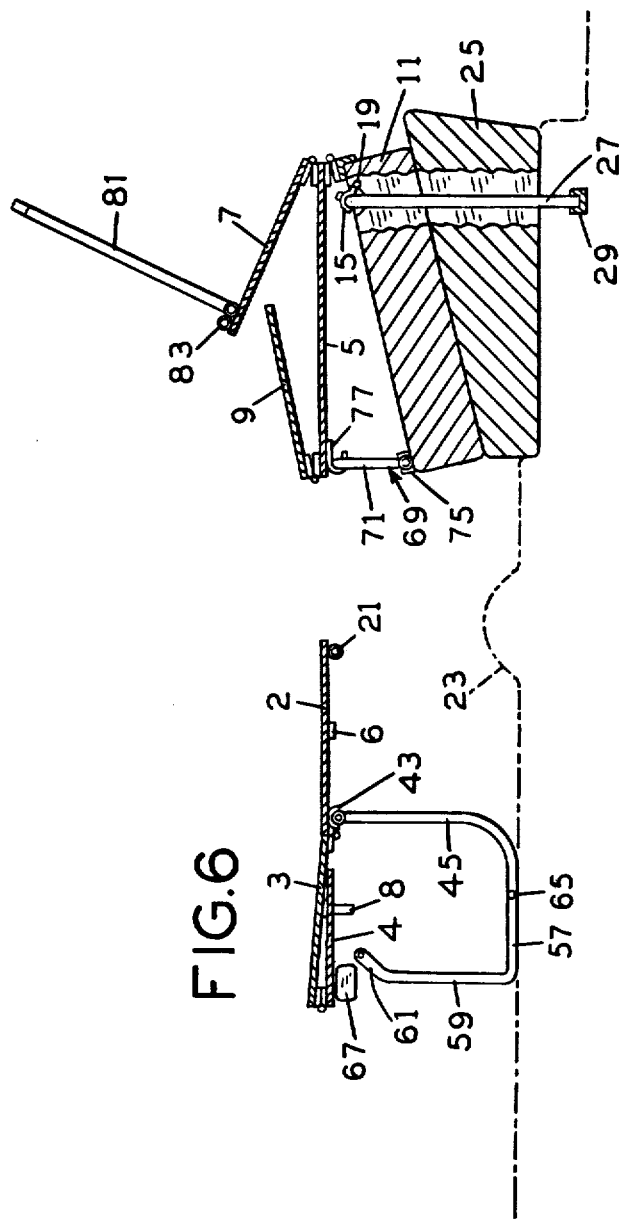

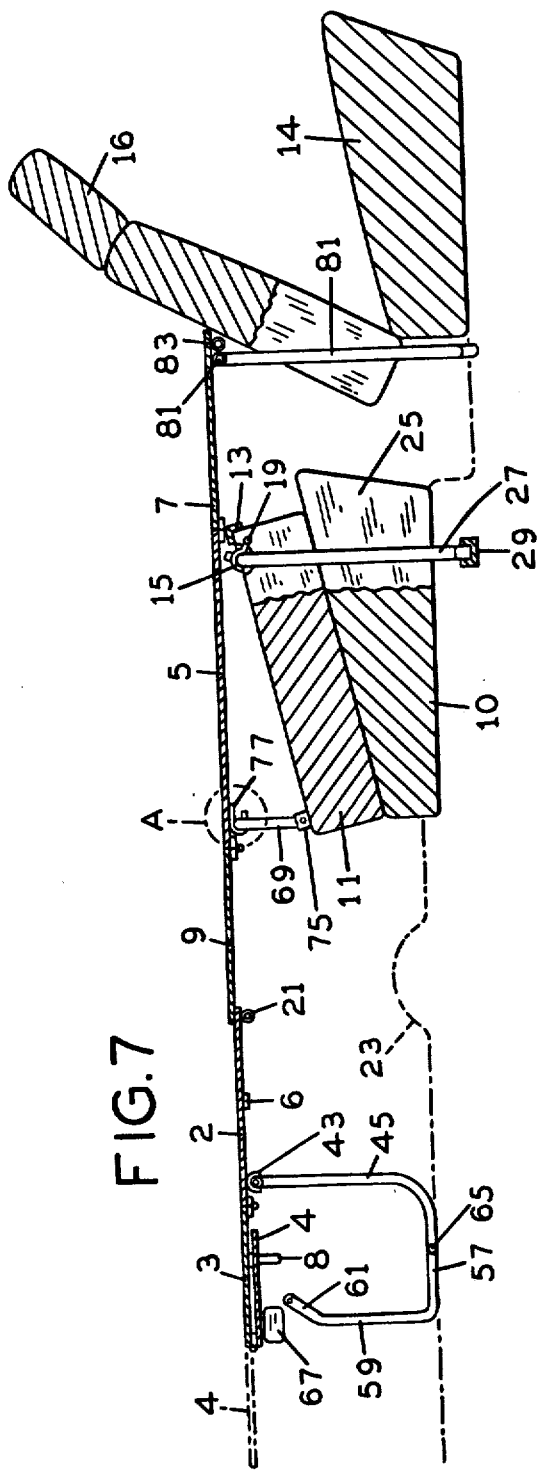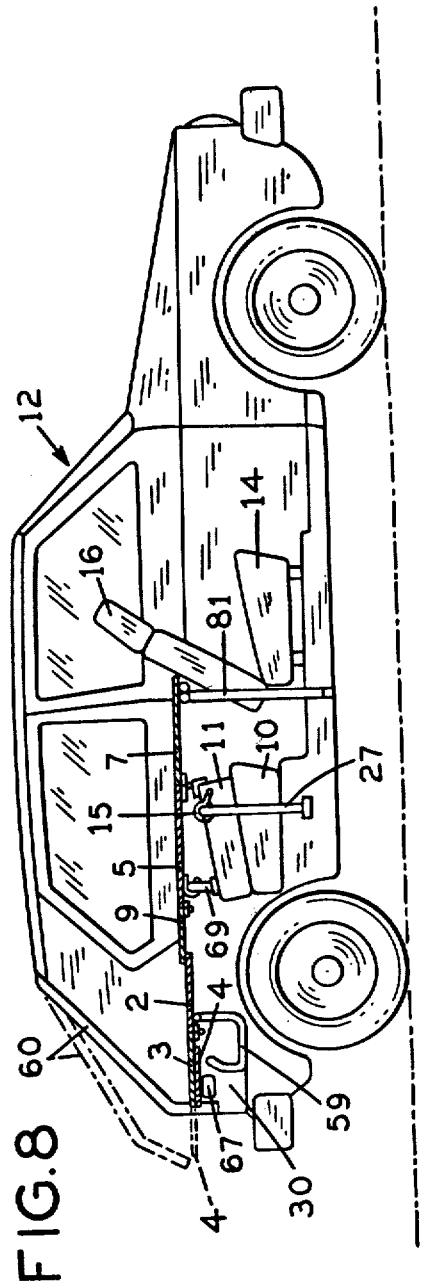

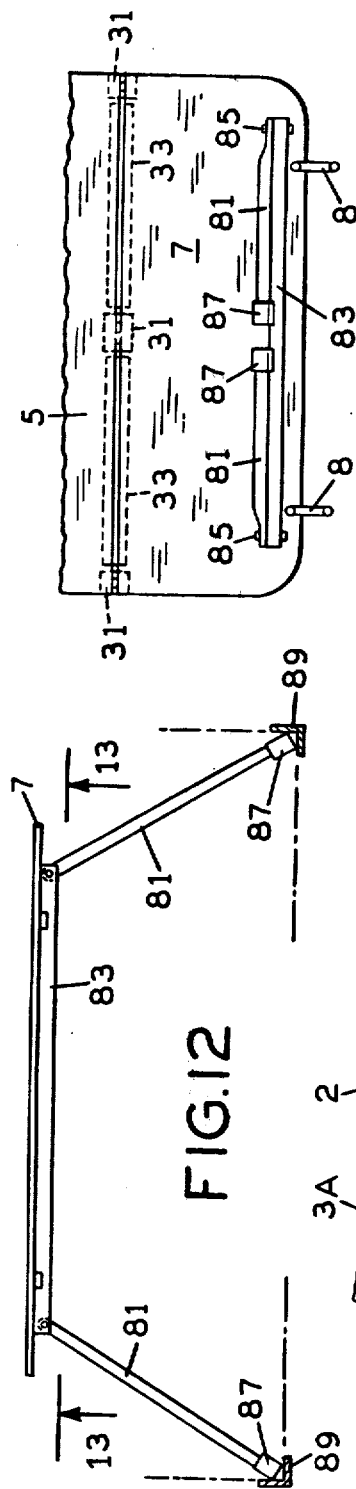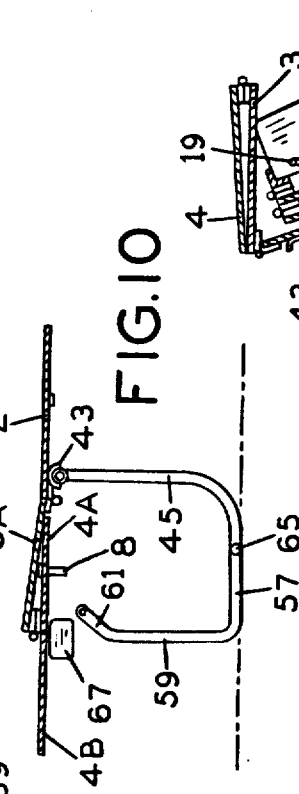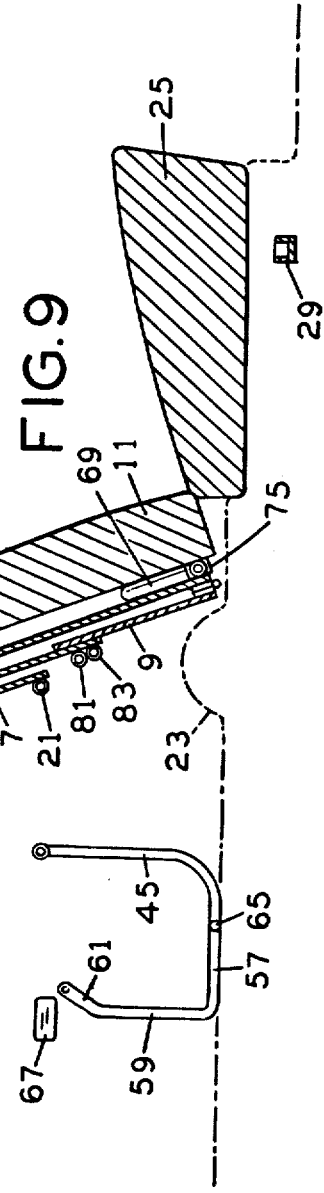

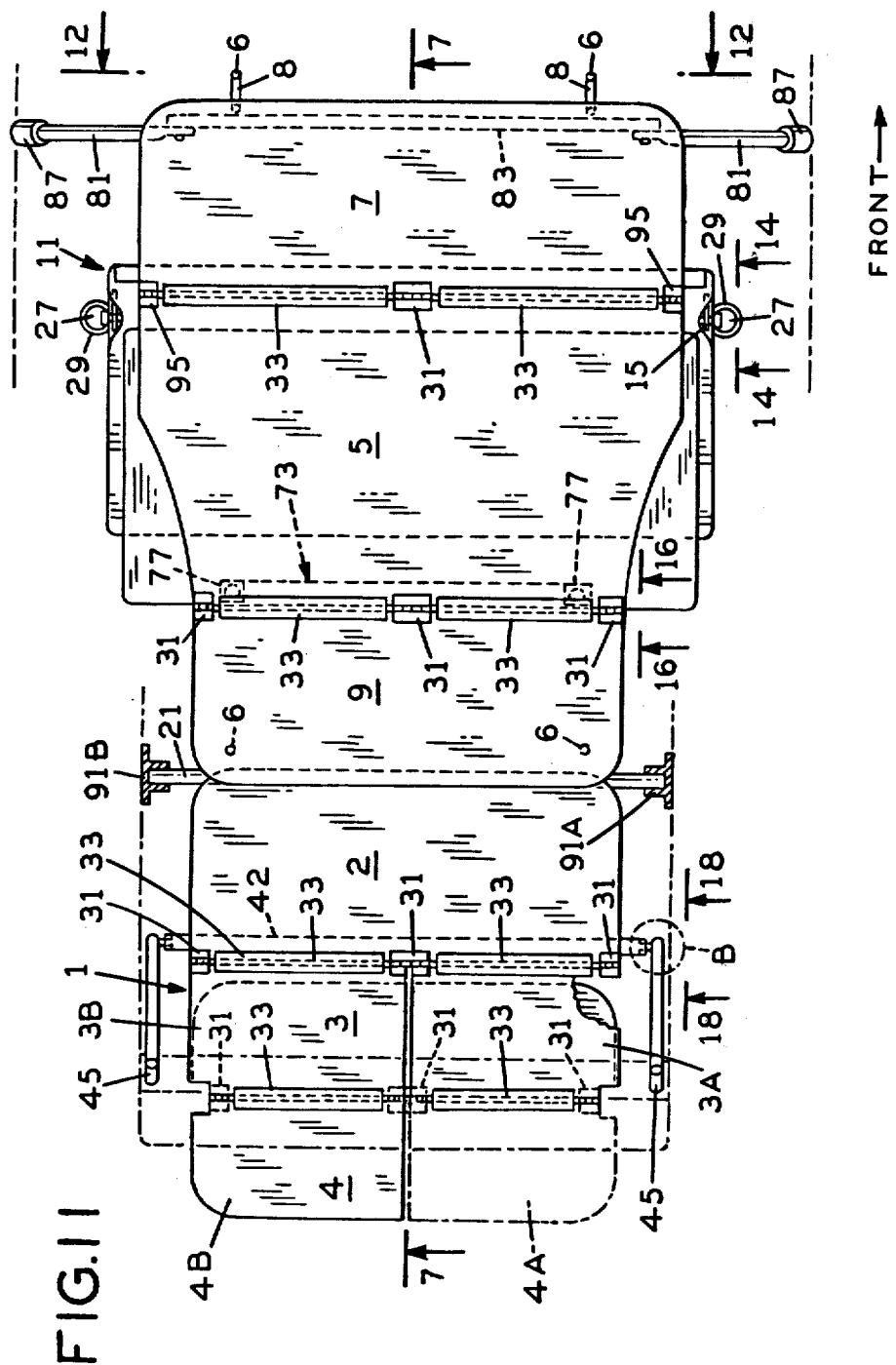

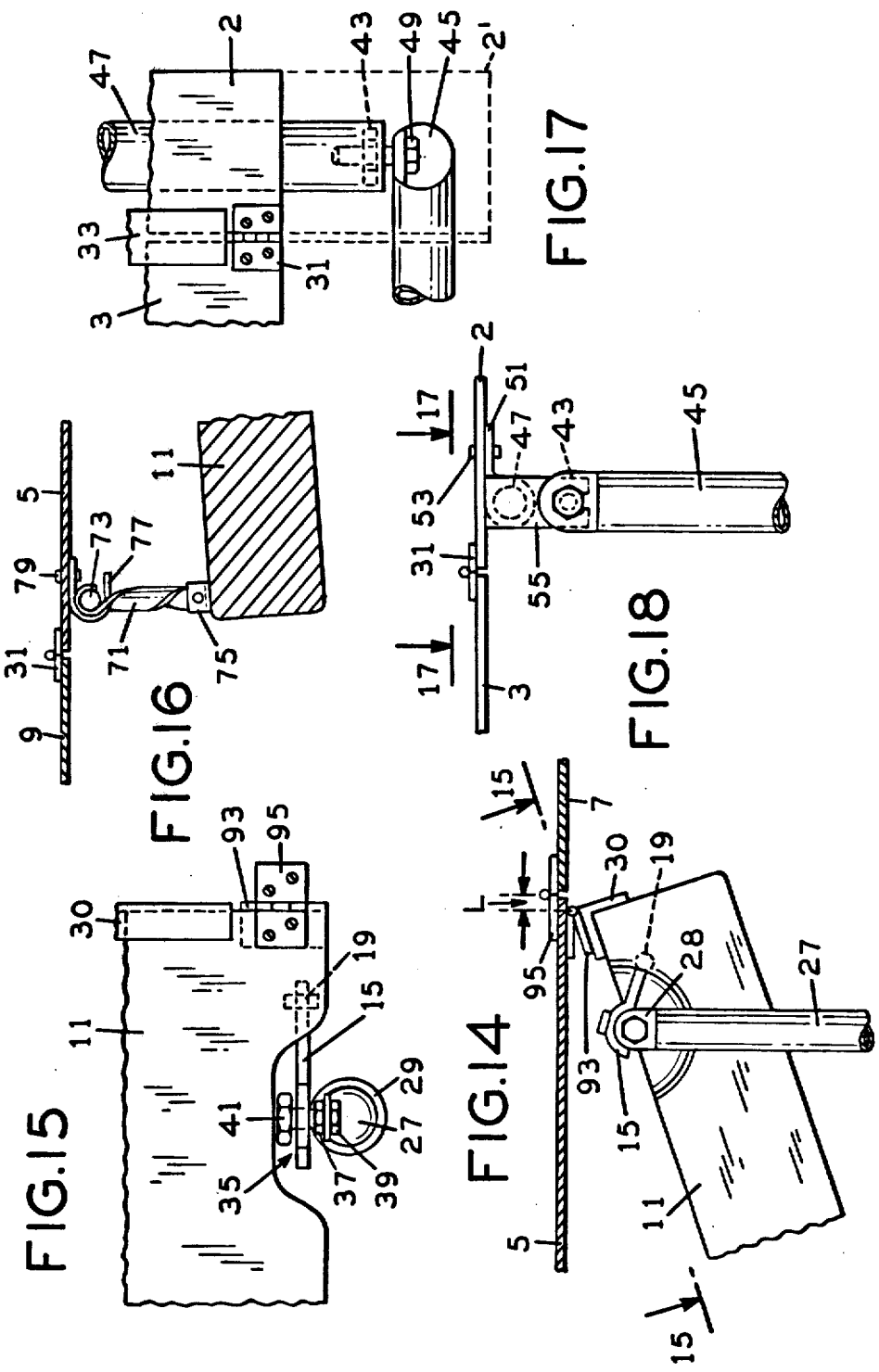

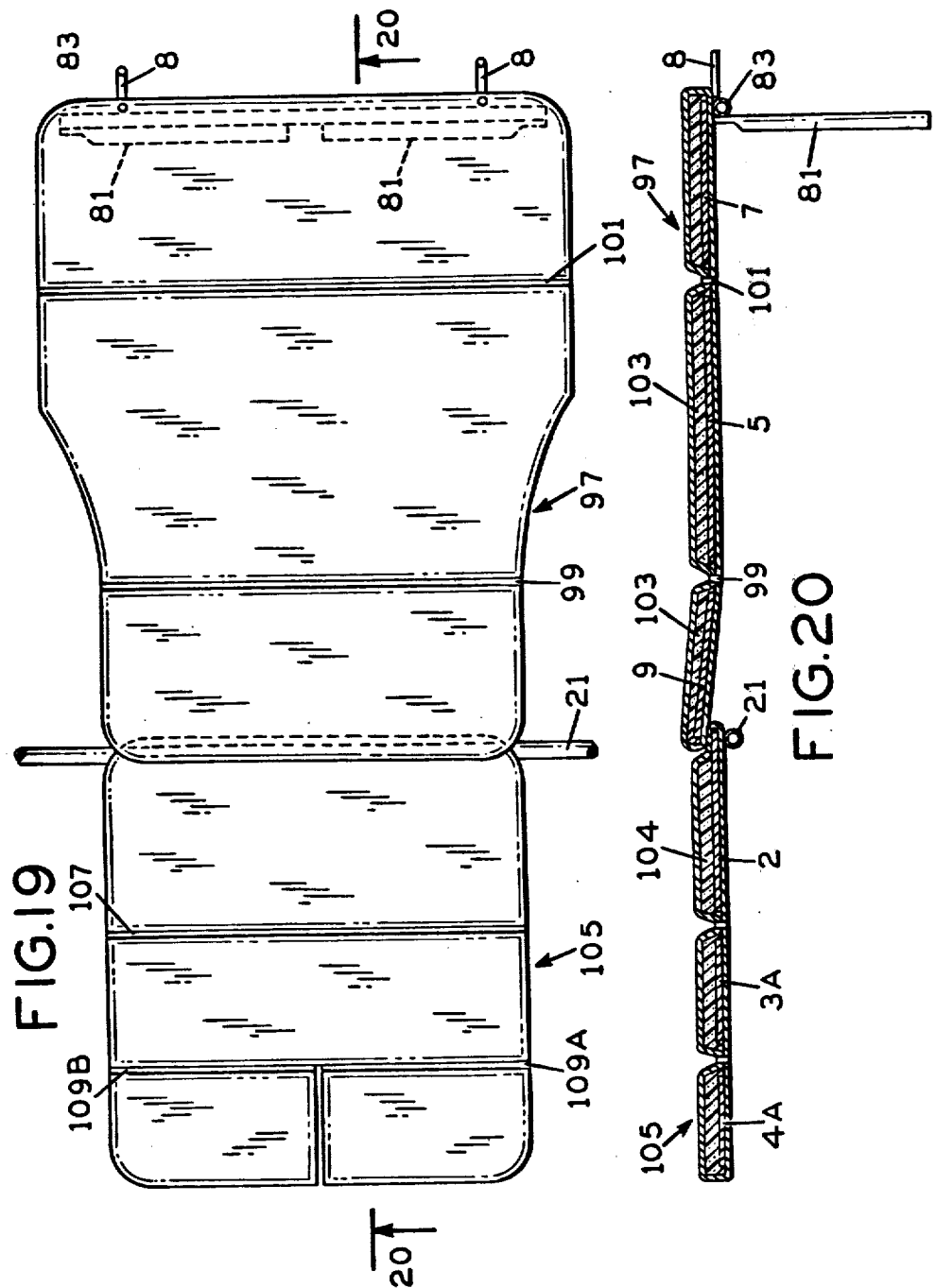

FOLDING PLATFORM AND SHELVES FOR USE IN VEHICLES

TECHNICAL FIELD

This invention relates to platforms and shelves which may be used in vehicles. In particular, it relates to folding platforms and shelves which can be used in small automobiles and folded to occupy only a very small volume when not in use.

BACKGROUND ART

Various attempts have been made in the past to provide support platforms of extended length in automobiles which may be useful for example as the support for a cushion or mattress. U.S. Pat. No. 2,926,948 illustrates a folding seat for station wagon which may be folded down to extend the cargo support floor. A similar innovation is U.S. Pat. No. 3,097,881 for a vehicle cushion arrangement. For the special case of vehicles with engines mounted in the rear see U.S. Pat. No. 3,188,134. A car bed and playpen for children is shown in U.S. Pat. No. 2,650,374. Finally, a complex structure including a frame and folding panels which may be configured to support seat cushions, bed cushions or as a stable for use in an automobile as illustrated in U.S. Pat. No. 3,317,238.

Most of the previously developed structures do not exhibit a great deal of versatility, are mechanically complex and expensive and add a great deal of weight to the vehicle, a consideration which is becoming increasingly important as the cost of fuel increases.

DISCLOSURE OF THE INVENTION

The folding platform of this invention is comprised of a series of hingedly connected panels, the edge of one of these panels being fixed to a shaft rotatively held in a transverse horizontal direction in close proximity to the rear of a seat with a folding back within the vehicle. The opposite edge of this panel is hinged to a second panel of this first series of panels. The panels of this first series are hinged to one another to unfold in the longitudinal direction of the vehicle, where they rest on vertical support members at regular intervals placed at positions associated with the portions of the panels where they are hinged. The panels may be folded preferably alternatively, so that they are substantially congruently over the first panel and then can be rotated as a unit with the shaft. A second series of panels is also hinged to one another. One of these panels is hinged to a horizontal transverse direction to the rear of the folding seat back, preferably at its top vertical extreme. These panels can fold congruently over the first panel against the back of the seat or when the seat back is folded down may be unfolded in the longitudinal direction of the vehicle to rest on vertical support members, spaced at regular intervals and thus form a substantially continuous platform with the first series of folding panels, when the first series of panels is unfolded.

The first series of panels when rotated and unfolded longitudinally in the vehicle may be used as a parcel shelf which serves to conceal material in the lower rear cargo area of the vehicle. These panels may be folded or rotated to allow access to the rear cargo area and then rotated easily back into place to conceal the contents and support a load. Access to the rear cargo area is available in this manner, and does not depend on whether the panels are unfolded to form a platform, or only a parcel shelf is formed.

The second series of panels may also be used as a parcel shelf when necessary.

Both sets of panels can be folded to be in close parallel proximity to the back of the rear seat, extending less than two inches from the back of the rear seat. In this case, while no parcel shelf is provided virtually the entire cargo area is available as storage space without any significant obstructions.

The folding panel assemblies are light in weight, easy to manufacture and because of their hinged connecting structure are self aligning, virtually falling into place when they are unfolded. In one embodiment of the invention the panels may be enclosed in a tightly fitting flexible fabric container with seams separating the panels and serving as hinges.

The folding platform of this invention is particularly useful for acting as a support for a series of cushions or a thin mattress which can be used as a bed in a small vehicle. In these applications the cargo area will generally not be long enough or wide enough to provide a comfortable sleeping platform. The apparatus of this invention when installed, for example, in a Volkswagen Rabbit is capable of extension to form a platform six feet two inches long and as wide as the interior of the vehicle thus providing comfortable sleeping quarters for two people.

BRIEF DESCRIPTION OF THE DRAWINGS

FIG. 1 is a schematic representation of the interior of an automobile equipped with the apparatus of this invention.

FIG. 2 is an enlarged diagrammatic view of the apparatus of this invention disposed in the rear of the automobile with the rear seat in the upright position.

FIG. 3 is similar to FIG. 2 but shows the rear seat folded with one of two supporting members in place.

FIG. 4 is similar to FIG. 3 with the first set of panels rotated counterclockwise from the position shown in FIG. 3 until horizontally supported.

FIG. 5 is similar to FIG. 4 showing the first set of panels horizontally extended and contained within the vehicle.

FIG. 6 next in a sequence from FIG. 5, shows the center panel of the second set of panels horizontally supported and the unfolding of the remaining two panels of the second set.

FIG. 7 shows all the panels except the rear most one of the first set unfolded to form a platform.

FIG. 8 is similar to FIG. 1 but the apparatus is unfolded as shown diagrammatically in FIG. 7.

FIG. 9 shows how the first set of panels may be rotated from the horizontal position to overlap the rear seat to allow access to the cargo area of the vehicle when these panels are used as a parcel shelf.

FIG. 10 shows the position of the first set of panels when used as a parcel shelf contained wholly in the vehicle or extending slightly beyond the back.

FIG. 11 is a plan view of the apparatus of the invention.

FIG. 12 is taken along line 12—12 of FIG. 11.

FIG. 13 is taken in the direction shown by line 13—13 of FIG. 12.

FIG. 14 is taken along line 14—14 of FIG. 11.

FIG. 15 is a view taken along line 15—15 of FIG. 14.

FIG. 16 is an enlarged view of the region noted as "A" of FIG. 7 and the surrounding area.

FIG. 17 is an enlarged view of area "B" of FIG. 11.

FIG. 18 is taken along line 18—18 of FIG. 11.

FIG. 19 is a plane view of an alternate embodiment of the invention.

FIG. 20 is a cross sectional view taken along line 20—20 of FIG. 19.

DETAILED DESCRIPTION OF THE INVENTION

Referring to FIG. 1 the first and second series of hinged panels making up the apparatus of the invention are shown in their folded or stored position behind a folding seat, in this case the rear seat 10 of an automobile 12. While it appears that a great volume is occupied by these panels, it should be noted that FIG. 1, as is the case for the other drawings of this invention, when appropriate, is merely schematic in nature to best illustrate the invention. In a preferred embodiment each panel would be in the order of less than 3/16 inch thick (0.48 cm) and the dimension indicated at "W" in FIG. 1 could be as small as one and one half inch.

The panels 1 are of a sandwich construction comprised of a core of ⅛ inch thick masonite with 0.020 inch aluminum sheets on both sides. Aluminum sheets which become top surfaces are textured with, for example, a cross hatch pattern to provide some friction for items placed on the panels when they are in a horizontal position. The aluminum covering of bottom surfaces is generally smooth. Both aluminum sheets are bonded to the masonite by adhesive and bonding techniques well known in the art such as contact cements or other conventional adhesives. This thin sandwich construction results in a strong lightweight panel. It is recognized that other construction techniques and different materials may be used to form stronger or lighter panels without departing from the scope of the present invention.

Referring to FIG. 11, which shows a view of the panels 1 unfolded, the panels 1 are hinged together at their edges by conventional short hinges 31 connected to the panels by rivets or other suitable means. Long continuous plastic strip hinges 33 formed of a plastic such as polypropylene are then bonded with tacking cement to span the adjacent edges of the panels so that gaps between the panels in the direction of the folds, which is the transverse direction in the vehicle, are covered when the panels are in their horizontal unfolded position. It is recognized that it may be possible to use hinges which are integrally molded into, for example, plastic panels in this invention.

Referring to FIG. 1, the front seat 14 of the automobile should preferably have a folding back 16 which can be released to fold forward and provide space so that the second series of panels which is attached to the back of seat 10 can be completely unfolded to a horizontal position. This second set of panels may be of a masonite and aluminum construction similar to the first set. It will be understood by one skilled in the art that if this invention is to be installed in a Volkswagen Rabbit, the rear parcel shelf installed by the manufacturer must be removed to avoid mechanical interference with the panels 1, which will serve as the parcel shelf as outlined below.

Referring to FIG. 2, which is diagrammatic in nature, folding seat back 11 of rear seat 10 has affixed to it angle 13 by suitable fasteners such as screws, not shown. Angle 13 may extend along the rear top corner of seat back 11 for a distance equal to the width of panel 5. Panel 5 is hinged to angle 13. Panel 5 is hinged at its top to panel 7 and at its bottom to panel 9.

Seat back 11 is maintained in the position shown by latch 15 which engages a post, not shown, provided by the manufacturer in the case of the Volkswagen rabbit. This post protrudes from the side of the vehicle. Extension 17 of latch 15 may be engaged by the vehicle user's fingers to rotate latch 15 in a clockwise direction about pivot point 19 thus releasing it from the post and allowing seat back 11 to fold forward. Two such latches 15 may be used, one at either end of seat back 11 as is well known in the art.

When seat back 11 is thus released panels 5, 7, 9 and associated components pivot forward to a position shown in FIG. 3. A panel 2, which is one panel of the first series of panels (not mechanically connected to panels 5, 7 and 9) associated with seat back 11 has an edge fastened to a tube or shaft 21 which is rotatively fixed in a transverse horizontal direction within the vehicle in close proximity to the rear of a folding back 11 of seat 10. Panel 2 is transversely hinged to panel 3 which is in turn transversely hinged to panel 4 so that the panels may be unfolded in the longitudinal direction, the longitudinal direction being defined as generally along an axis from the front to the back of the vehicle. This first set of panels 2, 3 and 4 when in its stored position shown in FIG. 2 can rotate as a unit with shaft 21 by virtue of snap fasteners 6 located in close proximity to the edges of panels 2 and 4, and a short band 8, which may be elastic between these fasteners on the front of panel 2 and rear of panel 4. Two such sets of fasteners 6, and band 8, one at each end of panels 2, 3 and 4 may be used. This arrangement serves to hold panels 2, 3 and 4 together as a unit preventing them from unfolding.

As illustrated in FIG. 3, the first series of panels comprised of panels 2, 3 and 4 are maintained at an angle of 10 to 20 degrees from the vertical by virtue of resting upon an extension of wheel well 23, shown in dotted lines. This angle should be substantially identical to the angle of inclination of seat back 11 when in the raised position shown in FIGS. 1 and 2. Panels 2, 3 and 4 are shaped so that the panels will rest on wheel well 23 and assume this angle.

When seat back 11 is folded forward as shown in FIG. 3, if it were not secured by some means, any vertical forces exerted upon it would tend to compress its cushion or the cushion of the seat bottom 25 thus providing a rather unstable support for a horizontal platform produced by the unfolding of panels 7 and 9. To remedy this situation a vertical support member 27 which engages latch 15 and extends to the floor of the vehicle to fit in a cup 29 is provided to maintain seat back 11 at a predetermined height. As can be seen by reference to FIG. 11, two such vertical support members are used, one at each side of seat back 11. These vertical support members 27 are stored generally in some other portion of the vehicle, for example the trunk or vehicle cargo area 30 when their use is not required.

Member 27 is formed from an aluminum tube as are most of the vertical support members used in this invention. Other suitable materials may be used but aluminum has the advantage of being relatively strong while light in weight, readily available, fairly inexpensive and easy to form. The end of the tube which fits into cup 29 may be closed by a suitable elastomeric tip or foot pad, not shown such as might be used at the end of a walking cane as is well known in the art. Referring to FIGS. 14 and 15 the upper end of support member 27 is flattened to form a vertical tab 28, through which a suitable bolt 35 may be secured to tab 28 by nuts 37 and 39 as can be seen in FIG. 15. The area of bolt 35 between its head 41 and nut 37 contacts latch 15 which is internally pivoted within seat back 11 on pivot 19. Latch 15 may only pivot approximately 20 degrees to 25 degrees, coming to rest in the position shown in FIG. 14 with the result that seat back 11 is held or maintained at a vertical height by virtue of support member 27 engaging latch 15.

Referring to FIG. 4, panels 2, 3 and 4 have been rotated counterclockwise through an angle of approximately 260 degrees so that panel 2 is horizontal. Panel 2 is maintained in this horizontal position by virtue of the bifurcated extensions 43 of a tube located on the underside of panel 2 coming to rest on a bolt extending horizontally through support member 45. Referring to FIG. 17, it can be seen that tube 47 which extends under and is fastened to panel 2 as shown in FIG. 11 engages bolt 49 attached to tubular support member 45. Referring to FIG. 18 tube 47 is secured to panel 2 by two or more clamps 51 which may be attached to panel 2 by fastener 53, a bolt or rivet. These clamps 51 extend around the circumference of tube 47. The ends of tube 47 are flattened and folded over to form extension 55, the end of which is bifurcated into extensions 43 which fit around and are supported by bolt 49 as can be seen in FIGS. 17 and 18.

Referring to FIG. 4, tube 45, flattened to form a tab through which bolt 49 may extend in a manner similar to that described for tab 28 of support member 27, extends downward to the bottom of the rear cargo area of the vehicle. It then bends into a portion 57 which rests on the floor of the cargo area. Another bend is provided so that the tube then runs vertically along the rear of the cargo area as seen at 59. A final bend causes extension 61 to run more or less horizontally against the rearmost wall of the cargo area where it is bolted to this rearmost wall by a bolt or sheet metal screw 63. It is preferred that all of the above described sections of tubular member 45 be located as close to the walls and rear of the vehicle as is possible. This results in a minimum amount of interference with the use of the cargo storage area. An additional bolt or sheet metal screw can be provided at 65 to bolt tubular member 45 to the vehicle, preferably the vehicle wall.

Once panels 2, 3 and 4 have been rotated as a unit into the horizontal position snap 6 associated with band 8 can be disengaged from panel 2, and panels 3 and 4 may be unfolded.

Referring to FIG. 5, panels 3 and 4 have been unfolded as a unit and rotated to rest on support member 67 which is the sill associated with the rear hatch of the vehicle. As shown in FIG. 5, panel 4 has not been unfolded from panel 3 and therefore, panel 3 rests upon panel 4 which is disposed between panel 3 and support 67. This results in a slight upward inclination of panel 3 of perhaps 5 degrees. As can be appreciated, by referring to FIG 8 when panel 4 is located in this position, it is possible to fully close vehicle hatch or cargo door 60 without machanical interference with panels 3 and 4.

Before unfolding panels 7 and 9 which are secured to one another by snap fasteners and band in a manner similar to panels 2 and 4 as indicated by fasteners 6 and band 8 shown in FIG. 11, it is necessary that panel 5 be vertically supported at its rear so that it assumes a horizontal position as shown in FIG. 6. This is accomplished by means of a vertical support structure 69 which can pivot against seat back 11 to fit between panel 5 and seat back 11 as shown in FIG. 5 or be extended to a vertical position as shown in FIG. 6. Referring to FIGS. 6, 11 and 16, a pair of members 71 are attached to tube 73 which is held horizontally and transversely in the vehicle by members 71 which have ends attached to seat back 11. Members 71 pivotally attached to seat back 11 by right angle brackets 75, one of which is shown in FIG. 6. Members 71 may be formed from a flattened and twisted aluminum tube having a portion that circumferentially surrounds tube 73 and a tab portion with a hole that accepts a screw or bolt also passing through a hole in right angle bracket 75. Tube 73 and members 71 may be moved in an arc from the position shown in FIG. 5 to that shown in FIG. 6, a substantially vertical position in which tube 73 is engaged into hook-shaped brackets 77 which concavely face the direction from which the bar is pivoted, to secure the tube in a substantially vertical position, thus horizontally supporting panel 5. Details of the structure can be more clearly seen by reference to FIG. 16. Hook-shaped bracket 77 may be secured to panel 5 by rivets or other suitable means 79.

Panels 5, 7 and 9 which form the second set of panels used in the invention are preferably of the same general construction as panels 2, 3 and 4 which form the first set. The exact sizes and shapes of these panels may vary however, so as to conform to the inside dimensions of the vehicle and provide maximum platform area.

Panel 9, a rearwardly unfolding horizontally supported panel, is unfolded from the position shown in FIG. 6 to that shown in FIG. 7. The rear edge comes to rest on the forward edge of panel 2 which is fixed to shaft 21. Shaft 21 thus provides vertical support for both panel 2 and panel 9.

As can be seen from FIGS. 6 and 12, panel 7, one of the panels in the second series of panels, is hinged to panel 5 so that it can be longitudinally unfolded forward of the rear seat to a horizontal position where it is supported by vertical support members 81, tubes which are pivotally connected to tube 83. Tube 83 is secured to the underside of panel 7 by rivets or other suitable fasteners.

As may be seen by referring to FIG. 7, in order to longitudinally unfold panel 7 it is necessary that the back 16 of front seat 14 be released and pivoted forward. This generally presents no problems when bucket seats are used as the front seats of the vehicle. Of course, it is generally not possible to drive the vehicle when the seats are in this position. As is typical of small vehicles, these seats fold forward to allow passenger access to the rear seat from a single door on each side of the vehicle. If it is necessary that the vehicle be driven, panel 7 may simply be folded back on panel 5 and seat back 16 moved to the usual driving position. The resulting platform will be shorter than that usually required to serve as a comfortable bed for adults but may be used to support a mattress upon which children of not too great an age may comfortably sleep while the vehicle is being driven.

With particular reference to FIGS. 2, 3 and 4, the first series of panels may be rotated with shaft 21 to a generally vertical, or erect, position, shown in FIGS. 2 and 3, which is in close parallel proximity to the second series of panels when the seat back is in the upright position and the second series of panels is folded against the seat back, as shown in FIG. 2. The first series of panels may be rotated into this erect position either when the seat back is in the upright position, shown in FIG. 2, or when the seat back is in the forward position, shown in FIG. 3. If the first series of panels is rotated into this erect position when the seat back is in the forward position, the seat back may thereafter be moved from the forward position shown in FIG. 3 into the upright position shown in FIG. 2, bringing all the panels of the first and second series of panels into folded positions in close parallel proximity to the seat back.

The details of the construction and use of vertical support members 81 and tube 83 can readily be seen by reference to FIGS. 11, 12 and 13. Tube 83 is attached to the underside of panel 7. Two support members 81 also tubular, with flattened ends are attached to the end of connecting member 83 by suitable attaching means such as nuts and bolts 85. Thus, tubular support members 81, pivotally attached to the underside of panel 7 may be folded against panel 7 for storage as is shown in FIGS. 1 through 5 or may be extended to reach to the floor of the vehicle when unfolded. The ends of the tubes are closed off by foot pads 87 similar to those which may be used at the bottom of vertical support member 27. These rest on the floor of the vehicle at the intersection of the floor and the vehicle structure as represented by 89 upon which the door closes. As may be seen from FIG. 12, foot pad 86 is wedged into this intersection 89.

Referring to FIGS. 7 and 8 it is noted that panel 4 may be unfolded from beneath panel 3 by swinging panel 3 upward and then unfolding panel 4 so that panel 4 assumes the position shown by the dotted lines in FIG. 7. In this position panel 4 will extend beyond the rear of the vehicle as may be seen in FIG. 8. It is necessary that the rear cargo door 60 be moved to the position shown in dotted lines in FIG. 8 if panel 4 is to be so extended. In this case, panel 3 will no longer be inclined by approximately 5 degrees to the vertical, but will be horizontal because it will rest directly upon vehicle sill or support member 67. The vehicle may be driven with panel 4 extended and hatch door 60 open but should be adequately ventilated if this is the case to prevent exhaust gas from accumulating within the vehicle. If a platform which comprises only the length of panels 5, 9, 2 and 3 is sufficient for the purpose intended then panels 7 and 4 may be moved to their folded positions and the vehicle driven with hatch door 60 closed.

FIGS. 9 and 10 show how the apparatus of this invention may be used as a parcel shelf only. Seat back 11 is returned to its upright position after the folding of support members 81 against panel 7 as panels 7 and 9 are folded substantially congruently over panel 5 by reversing the procedure shown in FIGS. 6 and 7. Vertical support members 27 have also been removed and stored as indicated above. Support structure 69 is folded against seat back 11 before seat back 11 is returned to the vertical position. Latch 15 engages vehicle posts not shown as outlined above to secure seat back 11 in the verticle position. The first series of panels 2, 3 and 4 remain unfolded in the horizontal position shown in FIGS. 7 and 8. As shown in FIG. 9 however, seat back 11 is moved to its vertical position. Thus a parcel shelf to replace the one removed from the vehicle is provided by panels 2, 3 and 4 and vehicle seat 10 is available for use by passengers. When panel 4 is folded under panel 3 the shelf extends only to support 67 within the vehicle and the cargo door 60 may be closed. Alternatively, panel 4 may be extended outside the vehicle and the cargo hatch 60 left open. The parcel shelf thus created can be used to conceal materials stored in the cargo area below the parcel shelf and to support other items of cargo above the parcel shelf. These latter items will however, be visible through a window usually provided in the cargo door 60.

As illustrated in FIG. 9, panels 2, 3 and 4 may be pivoted with shaft 21 and folded over seat back 11 to allow complete access to the cargo area of the vehicle. As may be more fully appreciated from FIGS. 10 and 11, panels 3 and 4 may be formed each of a left and right member 3A and 3B, and 4A and 4B thus allowing access to either the right rear portion or left rear portion of the cargo area while permitting the opposite portion to continue to be covered by the panels remaining in a horizontal position. Generally panel 2 will also remain horizontal. However as shown in FIG. 9, panel 2 may be rotated with shaft 21 so that panel 2 is parallel to seat back 11 with panels 3 and 4 extending over the top of seat back 11. This allows access to the entire rear cargo area, while permitting seat back 11 to remain in the vertical position. Of course passengers should not be sitting on seat 10 at such times.

As may be seen with reference to FIG. 11 shaft 21 rotates within retainers 91A and 91B which are attached to the walls of the vehicle. In the Volkswagen Rabbit retainers 91A and 91B can be provided by simply placing a bracket horizontally along the vehicle wall above openings in the wheel-well structure which can conveniently receive shaft 21. In the so-called "deluxe" models a plastic wheel-well cover must be removed to reach the wheel-well structure. In vehicles where this convenient structure is not available those skilled in the art will have no difficulty in fashioning suitable supports or retainers to rotatively support shaft 21.

Panels 2, 3 and 4 have been shown to be narrower than panels 5, 7 and 9 in FIG. 11. This feature is merely schematic and it is recognized that panels 2, 3 and 4 may be as wide as interior structures of the vehicle will permit, often more closely approximating the width of panels 5, 7 and 9. For example, in the Volkswagen Rabbit the panels should not interfere with the parcel shelf supports (not shown) used to support the parcel shelf supplied by the manufacturer. If this is the case these supports will not have to be removed. It is possible as may be seen by referring to FIG. 17 that panel 2 may extend so as to project beyond vertical support member 45 as shown by the dotted lines indicated as 2' in FIG. 17.

It should be noted that the details of the manner in which the panels are hinged to one another will be apparent to one skilled in the art after reading the foregoing description and viewing the accompanying drawings. FIG. 14 shows the preferred method however for hinging panel 5 to angle 30 by means of hinge 93, and panel 7 to panel 5 by means of hinge 95. It will be noted that panel 5 extends forward of hinge 93 by some distance. Typically, this may be as large as 1 inch for the dimension shown as "L" in FIG. 14.

Panels 5, 7 and 9 may at times also be used as a parcel shelf. If the vehicle is to be driven, panel 7 must be folded back over panel 5. If a large odd shaped cargo is to be accommodated, panels 2, 3 and 4 may remain in the folded configuration shown in FIG. 3, while panels 5 and 9 or panels 5, 7 and 9 are unfolded. Of course panel 9 will rest on the uppermost extension of panel 3, and will not be horizontal. The extent to which this is so depends on how far panel 3 extends above shaft 21, which may be several inches in some embodiments, depending on the dimensions selected for the panels. It is understood that various combinations of dimensions for the panels, the number of panels, the number of vertical supports, and their exact placement can be selected after having read the above description and viewed the drawings so as to modify the invention for use in different vehicles. However, with the panel construction described above it is preferable that vertical supports be provided at approximately every eleven to fifteen inches.

An alternate embodiment of the invention is illustrated in FIGS. 19 and 20. In this embodiment panels 5, 7, and 9 are disposed in a tightly fitting fabric bag or container 97. As used herein the term fabric refers to any relatively thin flexible material whether of woven fibers or a plastic polymer. Seam 99, which may be provided by simply permanently connecting the upper and lower parts of container 97 along a line by any suitable means such as stitching or by hot sealing of plastic material separates panels 9 and 5. It provides a line along which container 97 may be folded, thereby providing a hinge between panels 9 and 5. Seam 101 separates panels 5 and 7 performing in the same manner as seam 99. Thin foam pads 103 may be included within container 97. Pads 103 should be thin enough so that when compressed when the assembly is folded the thickness of the assembly will not substantially increase.

Panels 2, 3A, 3B, 4A and 4B may be disposed in a container 105, similar to container 97, with seams 107, 109A and 109B separating the panels and serving as hinges. Operation of this embodiment of the invention is identical to that of the previously described embodiment. Support members such as tube 83 and shaft 21 are attached to the panels in the same manner as in the previous embodiment, but with the thin fabric of containers 97 and 105 being disposed between the panel and the necessary hardware.

Slight protrusion of panel 9 above panel 2 can be minimized by reducing the width of foam pad 104 so that none of it appears over panel 2 where the rear portion of panel 9 is supported, as shown in FIG. 20. This protrusion will thus be almost insignificant, especially when a thin mattress is placed over the folding platform thus formed.

One advantage of this second embodiment is that the assemblies have a warm upholstered look as opposed to the cold metallic look of the sheet aluminum covered panels, thus enhancing consumer appeal. Fabric color or design may match that of the vehicle's interior. In addition the hinges, hinge mounting hardware, and hinge strips of the previous embodiment are not required, quite possibly resulting in a reduction in cost. Finally, the panels do not produce any rattling noises when the vehicle is on a bumpy road.

Various other modifications of the invention in addition to those shown and described herein will become apparent to those skilled in the art from the foregoing disclosure.

Having thus described by invention, what I claim as new and desire to secure by Letters Patent Patent is:

1. A folding platform for a vehicle having a seat with a folding seat back supported for movement between an upright position and a forward position, the folding platform comprising:
   a first series of panels, the edge of a first panel of said first series being affixed to a shaft rotatively fixed in a horizontal direction behind and in parallel proximity to the seat back, the opposite edge of said first panel being hinged to a second panel of said first series of panels, said series of panels being hinged to one another to unfold in the longitudinal direction of the vehicle to rest on vertical support members and fold substantially congruently over said first panel to be rotated as a unit with said shaft;
   a second series of panels, a first panel of said second series of panels being horizontally hinged to the seat back and connected to a top vertical extreme of said seat back, said second series of panels being hinged to one another to fold substantially congruently with said first panel of said second series of panels against said seat back, and when said seat back is in the forward position, to unfold in the longitudinal direction of the vehicle to rest on vertical support members whereby a substantially continuous platform with said first series of folding panels is formed, when said first series is unfolded; and
   means for horizontally levelling said panel to said seat back when said seat back is folded; wherein
   the means for horizontally levelling said panel hinged to said seat back comprises a bar held horizontally and transversely in said vehicle by means of a pair of members attached to said bar, said members having ends pivotally attached to said seat back, and said bar moving from a position against said seat back to a substantially vertical position to engage brackets attached to said panel.

2. The platform of claim 1 further comprising means for maintaining the seat back at a predetermined height when the seat back is is in the forward position.

3. The platform of claim 2 in which the means for maintaining the seat back at a predetermined height comprises a tubular member, a bolt extending from the member, the bolt engaging the seat back, and an end of the tubular member resting on the floor of the vehicle.

4. The folding platform of claim 1, 2 or 3 wherein
   the first series of panels may be rotated with the shaft to an erect position, said erect position being in close parallel proximity to the position of the second series of panels when the seat back is in the upright position and the second series of panels is folded against the seat back;
   whereby, after the first series of panels is moved to the erect position, the seat back may be moved to its upright position with all of the panels in said first and second series of panels being folded in close parallel proximity against the seat back.

5. The folding platform of claim 4 in which the first and second series of panels extend no more than two inches from the seat back, when folded against the seat back.

6. The folding platform of claims 1, 2 or 3 in which a second panel of the second seriees of panels unfolds longitudinally rearward of said seat back to a horizontal position.

7. The folding platform of claim 6 wherein, when the second panel of the second series of panels is in the horizontal position, a rear end of the second panel of the second series of panels is supported on a forward end of the first panel of the first series of panels, whereby said shaft supports both the first panel of the first series of panels and the second panel of the second series of panels.

8. The folding platform of claims 1, 2 or 3 in which the vertical support members comprise a series of structural components which support the panels near points of hinge connection.

9. The folding platform of claims 1, 2 or 3 in which at least one of said series of panels is enclosed in a tightly fitting fabric container with seams in said container separating said panels and serving as hinges whereby said panels may be folded and unfolded.

10. A folding platform for a vehicle having a seat with a folding seat back supported for movement between an upright position and a forward position, the folding platform comprising:
a first series of panels, the edge of a first panel of said first series being affixed to a shaft rotatively fixed in a horizontal direction behind and in parallel proximity to the seat back, the opposite edge of said first panel being hinged to a second panel of said first series of panels, said series of panels being hinged to one another to unfold in the longitudinal direction of the vehicle to rest on vertical support members and fold substantially congruently over said first panel to be rotated as a unit with said shaft; and
a second series of panels, a first panel of said second series of panels being horizontally hinged to the seat back said second series of panels being hinged to one another to fold substantially congruently with said first panel of said second series of panels against said seat back, and when said seat back is in the forward position, to unfold in the longitudinal direction of the vehicle to rest on vertical support members whereby a substantially continuous platform with said first series is unfolded, and in which one of the second series of panels unfolds forward of the seat back to a horizontal position in which it is supported when the seat back is in the forward position.

11. The folding platform of claim 10 in which the forwardly unfolding panel is supported at its forward end by a pair of tubular members pivotally attached to the underside of the panel, said tubular members reaching to the floor of said vehicle when unfolded, and lying flat against the panel when folded.

12. A folding shelf for a vehicle having a seat with a folding seat back supported for movement between an upright position and a forward position, the folding shelf comprising a series of panels, a first panel of said series of panels being horizontally hinged to the seat back, said series of panels being hinged to one another to fold substantially congruently with the first panel against the seat back, and when the seat back is in the forward position, to unfold in the longitudinal direction of the vehicle to rest on vertical support members, the folding shelf further comprising means for horizontally leveling the panel hinged to the seat back when said seat back is in the forward position, and wherein the means for horizontally leveling the panel hinged to the seat back comprises a bar held horizontally and transversely in the vehicle by means of a pair of members attached to the bar, the members having ends pivotally attached to the seat back, said bar moving from a position against the seat back to a substantially vertical position to engage brackets attached to said panel.

13. The folding shelf of claim 12 in which the panel hinged to the seat back is connected to a top vertical extreme of the seat back.

14. The folding shelf of claim 12 further comprising means for maintaining the seat back at a predetermined height when said seat back is in the forward position.

15. The folding shelf of claim 12 in which the means for maintaining the seat back at a predetermined height comprises a tubular member, a bolt extending from said member, the bolt engaging the seat back, and an end of said tubular member resting on the floor of the vehicle.

16. A folding shelf for a vehicle having a seat with a folding seat back supported for movement between an upright position and a forward position, the folding shelf comprising a series of panels, a first panel of said series of panels being horizontally hinged to the seat back said series of panels being hinged to one another to fold substantially congruently with the first panel against the seat back, and when the seat back is in the forward position, to unfold in the longitudinal direction of the vehicle to rest on vertical support members, and in which one of the panels unfolds forward of the seat back to a horizontal position in which it is supported when said seat back is in the forward position.

17. The folding shelf of claim 16 in which the forwardly unfolding panel is supported at its forward end by a pair of tubular members pivotally attached to the underside of the panel, the tubular members reaching to the floor of the vehicle when unfolded, and lying flat against said panel when folded.

18. The folding shelf of claims 13, 12, 14, 15, 16 or 17 in which said series of panels is enclosed in a tightly fitting fabric container with seams in said container separating said panels and serving as hinges whereby said panels may be folded and unfolded.

19. In a vehicle having a seat with a folding seat back supported for movement between an upright position and a forward position, a folding platform comprising:
a front panel assembly including
first and second front panels,
first front hinge means connecting an upper portion of the first front panel to an upper portion of the seat back for pivotal movement between a folded position rearward of the seat back and a substantially horizontal, unfolded position, and
second front hinge means connecting an upper portion of the second front panel to an upper portion of the first front panel for pivotal movement between a folded position, wherein, when the seat back is in the upright position, the second front panel overlaps, is rearward of, and is substantially parallel to the first front panel, and an unfolded position, wherein, when the seat back is in the forward position, the second front panel is substantially coplanar with and extends away from the first front panel and projects forward of the seat back; and
a back panel assembly including
a first rear panel,
a horizontal shaft transversely extending across the vehicle rearward of the seat, and
first rear hinge means connecting the first rear panel to the shaft for pivotal movement about the shaft between a folded position and a substantially horizontal, unfolded position.

20. The folding platform according to claim 19 wherein the first front hinge means comprises:
an angle member secured to the seat back and including a rear portion extending along a rear surface of the seat back adjacent a rear, top edge thereof; and
means connecting an upper edge of the first front panel to the rear portion of the angle member.

21. The folding platform according to claim 19 wherein the front panel assembly further includes:
a third front panel; and
third front hinge means connecting a lower portion of the third front panel to a lower portion of the first front panel for pivotal movement, when the seat back is in the forward position, between a folded position, wherein the third front panel overlaps and is substantially parallel to the first front panel, and an unfolded position, wherein the third front panel extends away from the first front panel and engages the first rear panel to form a generally planar platform therewith.

22. The folding platform according to claim 19 wherein the front panel assembly further includes:
   a support member; and
   means connecting the support member to the second front panel for movement between a folded position and a support position wherein the support member supports the second front panel forward of the seat back when the second front panel is in its unfolded position and the seat back is in its forward position.

23. The folding platform according to claim 22 wherein the means connecting the support member to the second front panel includes means connecting the support member to the second front panel for pivotal movement in a plane transverse to the longitudinal axis of the vehicle.

24. The folding platform according to claim 19 further comprising:
   a support member;
   bracket means secured to a lower portion of the first front panel to engage the support member; and
   means connecting the support member to the seat for movement between a folded position and a support position wherein the support member engages the bracket means to support the first front panel when the first front panel is in its unfolded position.

25. A folding shelf for a vehicle having a seat with a folding seat back supported for movement between an upright position and a forward position, the folding shelf comprising:
   first, second, and third panels;
   first hinge means for connecting an upper portion of the first panel to the seat back for pivotal movement between a folded position and a substantially horizontal, unfolded position;
   second hinge means connecting an upper portion of the second panel to an upper portion of the first panel for pivotal movement between a folded position, wherein, when the seat back is in the upright position, the second panel overlaps, is rearward of, and is substantially parallel to the first panel, and an unfolded position, wherein when the seat back is in the forward position, the second panel is substantially coplanar with and extends away fom the first panel and projects forward of the seat back; and
   third hinge means connecting a lower portion of the first panel to a lower portion of the third panel for pivotal movement, when the seat back is in the forward position, between a folded position, wherein the third panel overlaps and is substantially parallel to the first panel, and an unfolded position, wherein the third panel is substantially coplanar with and extends away from the first panel.

26. A folding shelf according to claim 25 wherein:
   the first hinge means includes means for pivotally connecting a top edge of the first panel to a top, rear edge of the seat back;
   the second hinge means pivotally connects a top edge of the first panel to a top edge of the second panel; and
   the third hinge means pivotally connects a bottom edge of the first panel to a bottom edge of the third panel.

27. A folding shelf according to claim 25 further comprising:
   a first support member;
   a bracket secured to the lower portion of the first panel for engaging the first support member; and
   means for securing the first support member to the seat back for pivotal movement between a folded position and a support position wherein the first support member engages the bracket to support the first panel when the first panel is in a substantially horizontal position.

28. A folding shelf according to claim 27 further comprising:
   a second support member; and
   means connecting the second support member to a lower portion of the second panel for pivotal movement between a folded position and a support position, wherein the second support member supports the second panel when the second panel is in a horizontal position projecting forward of the folding seat back.

* * * * *